United States Patent

[11] 3,604,983

| | | | | | |
|---|---|---|---|---|---|
| [72] | Inventors | Harry P. Levin<br>North Hollywood;<br>Robert K. Bunce, Pasadena, both of, Calif. | 3,334,272 | 8/1967 | Lipnitz ..................... 317/36 |
| | | | 3,434,011 | 3/1969 | Zocholl ..................... 317/33 |
| [21] | Appl. No. | 825,737 | 3,444,434 | 3/1969 | Zocholl ..................... 317/36 |
| [22] | Filed | May 19, 1969 | | | |
| [45] | Patented | Sept. 14, 1971 | | | |
| [73] | Assignee | Automation Electric, Inc.<br>Vernon, Calif. | | | |

*Primary Examiner*—J. D. Miller
*Assistant Examiner*—Harry E. Moose, Jr.
*Attorney*—Beehler & Arant

[54] INSTANTANEOUS AND INVERSE-TIME-OVERCURRENT SENSOR
21 Claims, 2 Drawing Figs.

[52] U.S. Cl................................................. 317/38,
 317/36 TD, 317/141 R, 317/142 TD
[51] Int. Cl................................................. H02h 3/08
[50] Field of Search........................................... 317/38, 36
 TD, 33, 22, 142, 141

[56] References Cited
UNITED STATES PATENTS
3,155,879  11/1964  Casey et al.................. 317/142 X ABSTRACT: An instantaneous and inverse time-overcurrent sensor for protecting a monitored circuit against overload conditions. The sensor includes a solid state reactor stage coupled to an inverse-time unit so as to produce a trip signal when a time-overcurrent condition in the monitored circuit exceeds a selected value. The t time-overcurrent characteristics of the device are readily adjustable to cover most circuit protection requirements. Additional circuitry is provided for producing an instantaneous trip signal upon the occurrence of an excessively high value of overcurrent. Indicator devices are provide d for giving visual indications, and retaining such indications, after the occurrence of an instantaneous or an inverse-time trip.

HARRY P. LEVIN
ROBERT K. BUNCE
INVENTOR.

BY Beehler & Arant

Lawrence V. Link, Jr.
ATTORNEYS 3,604,983

INSTANTANEOUS AND INVERSE-TIME-OVERCURRENT SENSOR

BACKGROUND OF THE INVENTION

This invention relates generally to instantaneous and inverse time-overcurrent protective devices; and more specifically to static, solid-state sensor devices which are readily adjustable to provide protection over a wide range of time-overcurrent conditions.

In the art of protective relaying of power transmission and distribution networks and of industrial apparatus, the time duration and the magnitude of an overcurrent condition which can safely be tolerated are related by a nonlinear function which arises as a result of the structural and heat dissipation characteristics of the apparatus or system to be protected. For example, some protective schemes may require a response characteristic which approximates the relationship defined by, "the line current squared times the duration of the overcurrent condition being equal to a constant" $i^2 \cdot t = k$). In other applications, such as in systems where coordination with the response characteristics of fuses is required, the inverse time-overcurrent function approximates the relationship $i^{3.5} \cdot t = k$. At the upper extreme of required protective characteristics are those used in association with the protection of devices such as mercury arc rectifiers, which devices are adequately safeguarded by an $i^8 \cdot t = k$ trip characteristic.

Also in power transmission and distribution networks selective tripping schemes are utilized wherein the time-overcurrent requirements vary as a function of the distance from the generating source, hence readily variable time-overcurrent characteristics are desirable.

Heretofore the vase majority of protective relaying for power transmission and distribution networks has been provided by electromechanical devices, which devices are still in widespread use by the electrical utility and other companies throughout the world. These prior art devices generally comprise magnetic core coils, induction disks and damping magnetics. Although the initial design of these devices may have been directed toward providing tripping characteristics which follow a precise mathematical law, in practice they produce a nonlinear response characteristic that is difficult to define by any relatively simple mathematical relationship. However, since any replacement devices should coordinate with the existing equipment of the power transmission and distribution networks, it would be highly desirable if the replacement units could be readily adjusted to follow the same time-overcurrent response curves as the electromechanical devices —regardless of what type of mathematical equation would be required to define these response curves.

Prior art devices have also a rather limited range of adjustment to accommodate different threshold current levels and delay times. No control over the shape of the inverse time-overcurrent curve is possible with these prior art devices and consequently a selection of a specific device having the desired operating characteristic must be made in each case. Therefore, a device with an extended range of adjustment and control over the shape of the operating characteristic curve is desirable.

Another series of problems associated with prior art rotating disk type devices arise from the momentum of the rotating assembly. In the event that the device responds to a short duration overcurrent condition, this momentum leads to overtravel and possibly a false tripping operation. Likewise the momentum of the rotating assembly causes a relatively long time interval from the time the overcurrent is removed until this assembly returns to its initial (reset) position. If another overcurrent condition occurs during this interval, the rotating assembly would attempt to reverse rotation, and since it then requires a lesser angular displacement to rotate to the trip position, the original time-overcurrent relation no longer holds. Also as a result of large momentum, a large amount of electrical energy is required to activate the device. This is reflected as a large burden on the current transformer, powering the device. Clearly then the elimination of momentum by solid-state methods would eliminate the problems of overtravel, slow reset and large burden.

A further problem arises from the low torque developed in a prior art rotating disc device near the threshold set point (pickup point). This results in indecisive erratic operation and may lead to false trips. A device that switches from a clearly defined logical off state to an on state and vice versa at the threshold level is therefore preferable.

Other limitations associated with prior art electromechanical devices concern accuracy, sensitivity and repeatability. These limitations preclude full utilization of the capabilities of modern high-speed circuit-interrupting devices and in particular vacuum breakers. The elimination of limited accuracy, sensitivity and repeatability in protective relaying would make it possible to exploit fully the speed and accuracy of the circuit-interrupting devices, without allowing extra design margins for the operation of the protective devices.

Another important consideration relates to the ever increasing capacity required of power transmission, distribution and utilization systems. As the capacity and complexity of the systems increase, so does the profusion and complexity of the protective schemes. Prior art devices, being single purpose, limited scope, electromechanical relays are not readily adaptable to these ever changing requirements and must be constantly replaced with others. As a consequence of the bulk and burden of prior art devices, the demand on panel space and transformer output is constantly increasing. The economics of the situation now indicate that the utilization of multiple purpose, flexible scope, low burden, small solid-state devices would overcome this problem.

SUMMARY OF THE INVENTION

This invention meets the above defined requirements by providing a static, solid state, inverse-time-overcurrent sensor and trip unit that is readily adjustable to produce any desired time-overcurrent response characteristic. Further means are provided for causing an instantaneous trip upon the occurrence of an excessively high level overcurrent condition; and for producing visual indications of the occurrence of either an inverse-time-overcurrent trip or of instantaneous overcurrent trip.

The versatility of the sensor and trip unit of the subject invention is made possible by a unique reactor stage which produces an output current that is a desired nonlinear function of the line current being monitored. The reactor stage includes a transistor device which may be adjusted to operate over different portions of its transfer curve, so as to produce the desired nonlinear output-input current relationship. In one preferred embodiment of the subject invention a voltage dependent resistor may be incorporated into the reactor stage to more accurately reproduce a given nonlinear function. The output current of the reactor stage is integrated by an inverse time unit and the output signal from this unit triggers a switch driving circuit for control of a trip unit. A reset unit, which is also adjustable, samples the magnitude of the line current and inhibits operation of the inverse-time unit until the occurrence of an overcurrent condition. The inverse-time unit is instantaneously cleared to a constant, initial value reference condition when the overcurrent condition is terminated.

Solid-state indicator circuits produce visual indications of the history of the overcurrent conditions; and means are provided for externally inhibiting the inverse-time and instantaneous trip circuits.

Accordingly it is an object of the subject invention to provide a time-overcurrent protective device which is readily adjustable to respond with a variety of selectable time-overcurrent characteristics.

It is another object to provide a solid-state protective device wherein the response to line current, the tripping delay time, and the thresholding levels are all readily adjustable.

A further object is to provide a time-overcurrent sensor which has a continuously adjustable response characteristic in excess of that defined by the equations $i^{1.5} \cdot t = k$ and $i^{16.5} \cdot t = k$.

Another object is to provide a solid-state device for protecting from both instantaneous and inverse-time overload conditions and which exhibits improved accuracy, repeatability and economy, as well as increased operating and reset speed.

It is still another object of the invention to provide a solid-state time-overcurrent sensor of the type described and which is compact, lightweight and requires small operating power.

Yet another object is to provide a solid-state protective device for power transmission distribution and utilization systems which is capable of sensing instantaneous and inverse-time-overcurrent conditions and of responding to external control signals for inhibiting either or both of the instantaneous and inverse-time trip functions.

A further object of the invention is to produce a solid-state time-overcurrent protective system which includes means for usually indicating the history of instantaneous or inverse-time stripping of the monitored system. Another object of the invention is to produce a solid-state time-overcurrent protective system which includes means for transmitting signals to, and receive signals from, protective, monitoring, supervisory or other control systems normally found in conjunction with electrical transmission, distribution or utilization systems.

With these and other objects in view, the invention consists of the construction, arrangement and combinations of the various parts of the device, whereby the objects contemplated are attained as herein set forth, pointed out in the appended claims and illustrated in the accompanying drawings.

DESCRIPTION OF THE PREFERRED EMBODIMENT

Figure 1:
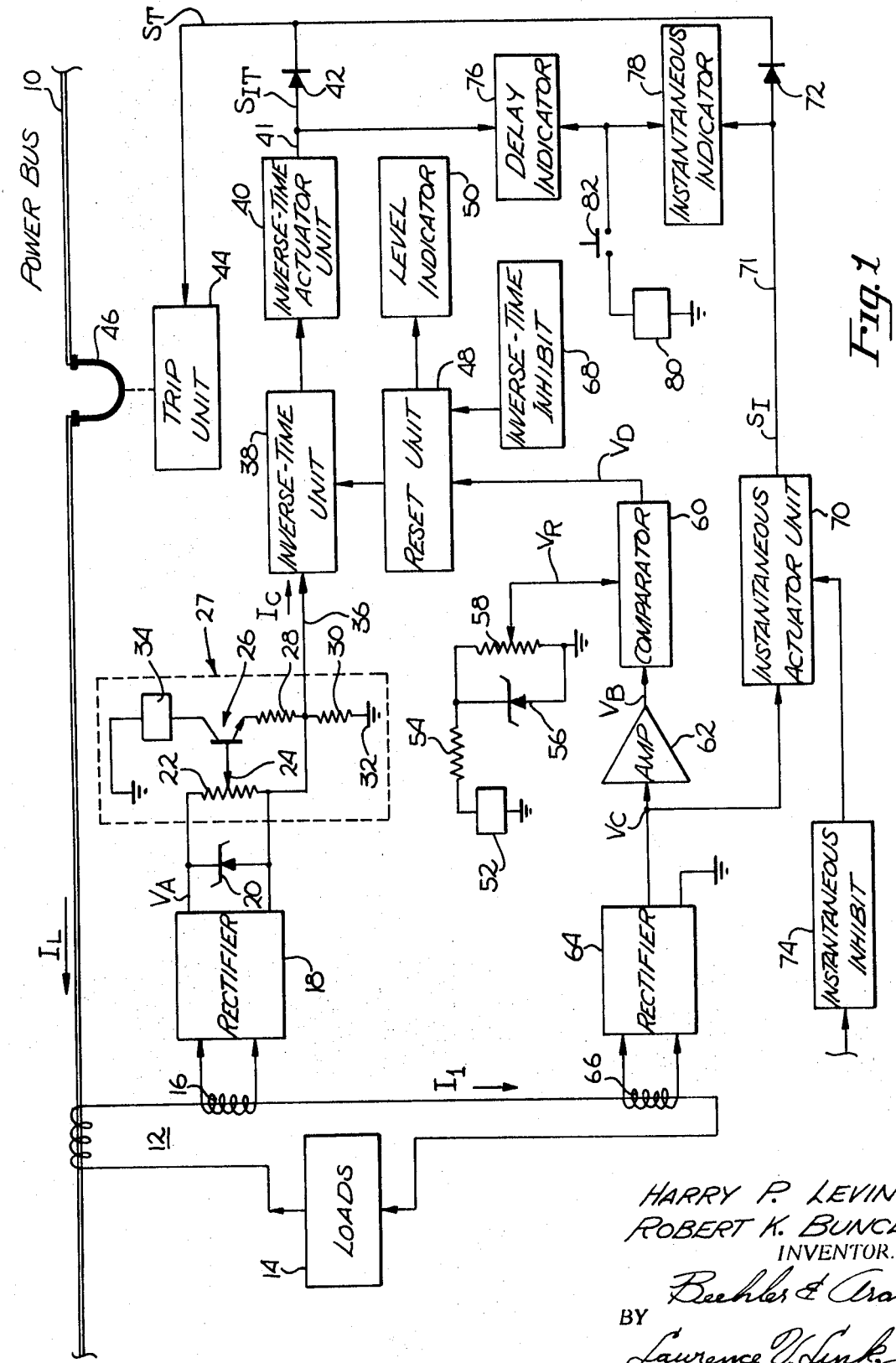
FIG. 1 is a block and schematic diagram of an instantaneous and inverse-time-overcurrent sensor system comprising a selected preferred embodiment of the subject invention.

In the embodiment of the subject invention, chosen by way of illustration, a current conductor 10 which may be a segment of a power transmission, distribution or utilization system, is protected against both high level current surges and lower level overcurrent conditions that persist for an interval in excess of a selected safe time duration. For power systems applications the solid-state, time-overcurrent sensor of FIG. 1 is normally packaged in one or more discrete modules and one such module is normally associated with each power phase, plus one for ground overcurrent protection in certain cases. The modules are normally housed in a rack together with trip units and auxiliary modules. The overcurrent trip signal from the sensor module for each of a plurality of phases may be coupled to the trip units associated with all the phases in a given circuit; whereby an overload condition in any one of the phases would completely interrupt all phases of the particular network.

Referring first primarily to FIG. 1, an instrument transformer 12 provides a current $I_1$ which is a function of the current $I_L$ in the conductor 10. The current $I_1$ is applied to other instrumentation and monitoring circuits, indicated generally be reference numeral 14, as well as to the sensor of the subject invention.

A coil 16 is inductively coupled to the circuit comprising the current transformer 12 so as to provide an AC (alternating-current) voltage, which is a function of the line current $I_L$, to a rectifier unit 18. The rectifier unit 18 produces an output DC (direct current) voltage $V_A$ across a zener diode 20 and a potentiometer 22. These last two mentioned elements are coupled in parallel across the output leads of the rectifier 18. The zener diode 20 is provided to protect the following circuitry against excessive voltages caused by line current surges.

A wiper terminal 24 of the potentiometer 22 is connected to the base of a transistor 26, which transistor is part of a reactor stage 27. The emitter terminal of the transistor 26 is coupled through a resistor device 28 and a resistor 30 to a ground potential plane (ground) 32. The collector terminal is connected to a positive DC voltage supply 34, and this supply is also referenced to ground potential plane 32. The junction point between the resistive device 28 and the resistor 30 is connected to one end of the potentiometer 22, and through a lead 36, to an input circuit of an inverse-time unit 38.

The reactor state 27 responds to a portion of the voltage $V_A$ coupled thereto through the potentiometer 22 to produce a current $I_C$ that is a desired nonlinear function of the line current $I_L$. One of the more important aspects of the subject invention is that a desired nonlinear response may be readily selected by positioning the wiper 24 such that the transistor 26 operates over different portions of its control voltage-output current transfer characteristic. As mentioned previously it may be desired to vary the time-overcurrent relationship of a given sensor module for different applications or locations within a power system; hence this adjustable feature of the reactor stage 27 is particularly desirable.

Tests have shown that the sensor module of the subject invention may be adjusted over a range in excess of the interval defined by the equations $i_L^{1.5} \cdot t = k$ and $i_L^{16.5} \cdot t = k$. The preceding equations were presented solely to give an indication of the range of the sensor device and not by way of limitation. As explained previously the response of the subject sensor need not follow any simple mathematical relationship but may be adjusted to reproduce any desired time-overcurrent response curve—such as the curves which describe the operation of the electromechanical devices presently in widespread use throughout the world. To this end, of fitting the response curve of the sensor to any desired characteristic, the resistive device 28 may include a voltage-dependent nonlinear resistor, and may be composed of a combination of standard and voltage dependent resistors in any required series or parallel combination.

During the time period of an overcurrent condition in the conductor 10, the current $I_C$ is integrated within the inverse-time unit 38. When the accumulated charge produces a selected voltage threshold level ($V_T$) the inverse-time actuation unit 40 generates an inverse-time tripping signal $S_{IT}$. This signal is applied through a lead 41 and steering diode 42 to a trip unit 44. In response to the inverse-time trip signal $S_{IT}$, the trip unit 44 actuates a circuit breaker 46 thereby interrupting the current $I_L$ in the conductor 10.

The output signal from the inverse-time unit 38 is held at a selected reference voltage level during nonovercurrent periods by a reset unit 48. A visual indication of the occurrence of an overcurrent condition is provided by a level indicator 50. The value of the threshold overcurrent level is selectable by means of a reference circuit which includes a DC voltage source 52, resistor 54, zener diode 56 and a potentiometer 58. The wiper terminal of the potentiometer 58 couples a voltage $V_R$ to the reference input circuit of a comparator unit 60. The input signal to the comparator 60 is a DC signal, $V_B$, which is applied from an amplifier 62. The input signal $V_C$ applied to the amplifier 62 is developed by rectifier 64 which is coupled to the circuit of current transformer 12 by a coil 66. Hence when the line current $I_L$ is below the overcurrent level as determined by the reference voltage $V_R$, the output signal of the comparator 60, $V_D$, is at a low level value such as ground. When the level of the current $I_L$ exceeds the overcurrent level then the signal $V_D$ switches to a high level value such as a selected positive voltage.

The output signal of the inverse-time unit 38 also may be held to the low reference voltage level by the application of external control signals applied through the inverse-time inhibit unit 68.

As explained previously, the sensor unit of the subject invention also protects against high amplitude current surges. This function is accomplished by instantaneous actuator unit 70 in response to the signal $V_C$. The actuator unit produces an instantaneous trip signal $S_I$ which is applied through a lead 71 and a steering diode 72 to the trip unit 44. The instantaneous actuator unit 70 may be externally controlled by means of an instantaneous inhibit unit 74.

The occurrence of an inverse-time trip signal or of an instantaneous trip signal is indicated by delay indicator 76 or instantaneous indicator 78, respectively, The supply potential for these indicator units is provided by a voltage supply 80, and they may be reset by momentarily interrupting the supply voltage through "break upon actuation" switch 82.

Figure 2:
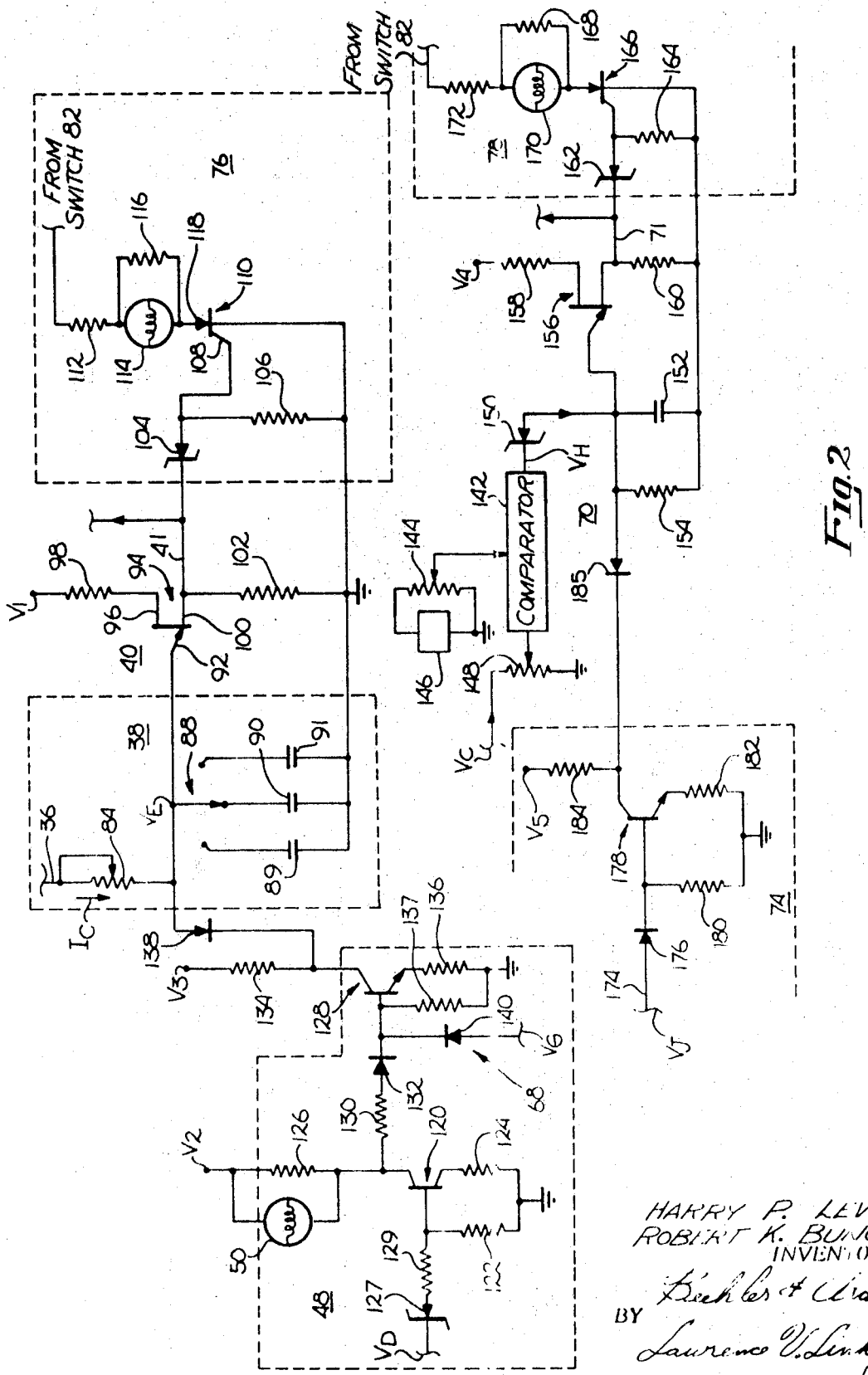
FIG. 2 is a schematic diagram depicting in greater detail certain selected circuits of the system shown in FIG. 1.

Certain of the units shown in FIG. 1 are illustrated in greater detail in FIG. 2. Considering first the inverse-time unit 38, in the most preferred embodiment shown in FIG. 2 the current $I_C$ is applied through a potentiometer 84 and the blade of a switch 88 to a selected one of capacitors 89, 90 and 91. The inverse-time unit 38 exponentially integrates the current $I_C$ and the response of this integration is controlled by the setting of potentiometer 84 and switch 88. The adjustment feature of these two last mentioned elements allow additional control in the selection of the nonlinear response of the subject sensor.

The blade of switch 88 is also connected to the emitter 92 of a unijunction transistor 94. A base 96 of the transistor 94 is coupled through a resistor 98 to a DC voltage supply indicated by the reference numeral $V_1$. The second base 100 of the transistor 94 is coupled through a resistor 102 to ground. When the voltage at the blade of switch 88 exceeds the threshold level ($V_T$) the capacitors are discharged through the emitter 92 thereby producing the signal $S_{IT}$ at the junction point between the base 100 and the resistor 102.

The signal $S_{IT}$ is coupled through a zener diode 104, across gate bias resistor 106 to the gate 108 of a silicon controlled rectifier (SCR) 110. The voltage from the source 80 (FIG. 1) is coupled through the switch 82, resistor 112, lamp 114 and resistor 116, to the anode terminal 118 of the SCR 110. When the signal $S_{IT}$ is applied to the gate 108, the SCR conducts causing the lamp 114 to be illuminated. The SCR remains in conduction even after the signal $S_{IT}$ terminates, until the voltage from the source 80 is interrupted by means of the switch 82.

It should be noted that although the indicator units 76 and 78 are described herein as comprising lamp circuits controlled by SCR devices, other suitable devices may be utilized in place thereof. For example an electromechanical indicator arrangement may be selected wherein the signal $S_{IT}$ actuates a mechanical toggle type device, and wherein further the device may be cleared by applying a reset pulse (which reset pulse would be analogous in function to the switch 82).

A reset unit 48 includes an inverting amplifier stage having a transistor 120 and resistors 122, 124 and 129. When the signal $V_D$, coupled from the comparator 60 through the zener diode 127 and the resistor 129 switches to the high level state, the transistor 120 conducts allowing current to flow from a DC voltage supply indicated by the reference designation $V_2$. The conduction of the transistor 120 allows the indicator lamp 50 to illuminate thereby providing a visual indication of the existence of an overcurrent condition.

The collector terminal of the transistor 120 is coupled through a resistor 130 and a diode 132 to a clamping stage comprising a transistor 128. The collector terminal of the transistor 128 is connected through a resistor 134 to a source of DC potential indicated by the reference designation $V_3$. The emitter terminal of the transistor 128 is coupled through a resistor 136 to ground. The collector terminal of the transistor 128 to further coupled through a diode 138 to the blade of the switch 88 (in the inverse-time unit 38).

When normal line current is flowing in the conductor 10, the transistor 128 is conducting and the signal $V_E$ (at the blade of the switch 88) is clamped to a low positive reference potential so that the inverse-time function of the sensor unit is inhibited. During the occurrence of an overcurrent condition the transistor 128 is switched out of conduction by the inverter stage comprising the transistor 120. The inverse-time unit 38 is therefore allowed to charge towards the threshold level ($V_T$) of the actuator unit 40. However the operation of the system may be selectively overridden by application of an external positive pulse $V_G$ through a diode 140 to the base of the transistor 128, thereby insuring that the transistor 128 remains in the conducting stage.

Instantaneous actuation unit 70 includes a comparator unit 142, the reference to which is applied from a circuit comprising a potentiometer 144 and a DC voltage supply 146. The signal $V_c$, from the rectifier 64 is applied through a potentiometer 148 to the signal input circuit of the comparator 142. The potentiometers 144 and 148 may be adjusted so that the comparator 142 switches to the high level state when the line current $I_L$ instantaneously exceeds a selected high current level, which level would be damaging to allow to remain for more for more than a fraction of a second.

The output signal $V_H$ from the comparator 142 is coupled through a zener diode 150 to a charging circuit comprising a capacitor 152 and a paralleling resistor 154. The value of capacitor 152 may be selected to obtain a desired time delay, and for power distribution system values of 0.2 to 10 $\mu f$. have proven satisfactory.

When the voltage across the capacitor 152 exceeds the threshold level ($K_1$) of a unijunction transistor 156, the capacitor is discharged through the transistor. A resistor 158 is coupled between a first base of the transistor 156 and a DC potential supply indicated by reference designation $V_4$. A resistor 160 is coupled between a second base of the transistor and ground.

The output signal $S_I$ (instantaneous trip pulse) is applied from the second base terminal of the transistor 156 to the diode 72 (see FIG. 1) through a lead 71. The signal $S_I$ is also applied through a zener diode 162 and across a gate biasing resistor 164 to the gate of a silicon controlled rectifier (SCR) 166. A resistor 168 is connected in parallel with a lamp 170 and the combination is connected in series between a resistor 172 and the anode terminal of the SCR 166. The operation of the instantaneous indicator unit 78 is similar to that described previously for the inverse-time indicator unit 76.

The instantaneous actuation unit 70 may be inhibited by applying a positive signal $V_J$ to a lead 174. The signal $V_J$ is coupled through a diode 176 to the base of a transistor 178. The transistor 178 and associated resistors 180, 182 and 184 are connected in a switching stage configuration similar to the stage comprising the transistor 128 explained previously. In response to the signal $V_J$ the voltage across the capacitor 152 is discharged through diode 185 and is clamped to a low positive value, hence inhibiting the triggering of the unijunction transistor 156.

In one practical embodiment, the parameter values and component types described in table I have provided excellent results in producing characteristics suitable for monitoring power transmission and distribution lines. It is explicitly understood however that these values of table I are included herein solely to insure the completeness of the disclosure of the subject device and should not in any way be interrupted as implying limitations to the breadth of the invention described hereinabove and claimed in the appended claims.

TABLE I

| Reference Designation | Nomenclature | Value or Type |
| --- | --- | --- |
| 20 | Zener diode | 1N4728 |
| 22 | Potentiometer | 1K Ohms |
| 26, 120, 128, 178 | Transistor | 2N1711 |
| 28 | Resistor | 270 Ohms |
| 30 | Resistor | 4.7K Ohms |
| 42, 72, 132, 138, 140, 176 | Diode | 1N 457A |
| 58 | Potentiometer | 1K Ohms |
| 60, 142 | Comparator | UA710C (Fairchild) |
| 62 | Amplifier | UA741 (Fairchild) |
| 89 | Capacitor | 22 $\mu f$. |
| 90 | Capacitor | 82 $\mu f$. |
| 91 | Capacitor | 100 $\mu f$. |

TABLE 1—Continued

| Reference Designation | Nomenclature | Value or Type |
| --- | --- | --- |
| 94 | Unijunction Tr | 2N2647 |
| 98 | Resistor | 150 Ohms |
| 102 | Resistor | 68 Ohms |
| 104 | Zener diode | Z4XL12 (General Electric) |
| 106 | Resistor | 470 Ohms |
| 110 | SCR | C6F (General Electric) |
| 112 | Resistor | 680 Ohms |
| 116 | Resistor | 2.7K Ohms |
| 122 | Resistor | 1K Ohms |
| 124 | Resistor | 10 Ohms |
| 126 | Resistor | 1K Ohms |
| 127 | Zener diode | Z4XL-14B (General Electric) |
| 129 | Resistor | —220 Ohms |
| 130 | Resistor | 618K Ohms |
| 134 | Resistor | 2.2K Ohms |
| 136 | Resistor | 27 Ohms |
| 137 | Resistor | 1K Ohms |
| 150 | Zener diode | Z4XL9.1 (General Electric) |
| 152 | Capacitor | 0.2 to 10 µf. |
| 154 | Resistor | 2.2 Meg. Ohms |
| 156 | Unijunction transistor | 2N1617B |
| 158 | Resistor | 150 Ohms |
| 160 | Resistor | 68 Ohms |
| 162 | Zener diode | Z4XL12 (General Electric) |
| 164 | Resistor | 470 Ohms |
| 166 | SCR | C6F (General Electric) |
| 168 | Resistor | 2.7K |
| 172 | Resistor | 680 Ohms |
| 180 | Resistor | 1K Ohms |
| 182 | Resistor | 27 Ohms |
| 184 | Resistor | 2.2K Ohms |

It is now apparent that the versatility of the device in accordance with the subject invention is provided primarily by the unique reactor stage 27 which is readily adjustable to produce a wide range of nonlinear relationships between the line current $I_L$ and the charging current $I_C$. Also the incorporation of nonlinear voltage dependent resistors within the resistive device 28 serves to extend the controllable range of the reactor stage 27. Further it will be recalled that the potentiometer 84 and the switch 88 allows adjustment of the exponential response (charging time constant) of the inverse-time unit 38. The unit 38 in association with the threshold level of the inverse-time actuation unit 40 therefore contributes to the final time-overcurrent response of the sensor.

The level of the line current $I_L$ which will be considered an overcurrent condition is determined by the reference voltage $V_R$, and it is precisely adjustable by means of potentiometer 58. Prior to the occurrence of an overcurrent condition, the reset unit 48 holds the voltage $V_E$ (which voltage controls the inverse-time actuation unit 40) to a constant low reference potential level. Hence the charging capacitors of the inverse-time unit 38 begin each charging cycle at precisely the same initial value, thus insuring reliable and repeatable operation.

Further it is important to note that the reset unit 48, being mechanized with the solid-state components, is capable of resetting the inverse-time unit 38 in a small fraction of a second after a line fault clears. Therefore the sensor is continuously able to perform without limitations as to the time period between faults.

The determination of the magnitude of line current surges required to trigger the instantaneous actuator unit 70 is controlled by either reference potentiometer 144 or the input potentiometer 148. It is noted that in the interest of economy the comparator 142 and its associated reference circuit may be deleted and the cathode terminal of the zener diode 150 connected directly to the wiper of potentiometer 148. In this just described configuration the breakdown voltage of the zener diode 150, in conjunction with the setting of the potentiometer 148, determines the surge current trip level. Further the repeatability of the time delay of the unit 70 may be improved by coupling a zener diode across the potentiometer 148, so as to limit the maximum charging voltage.

The time-inverse and instantaneous trip signals $S_{IT}$ and $S_I$, respectively, are "ORed" by diodes 42 and 72 to form the trip signal $S_T$ that controls the trip unit 44. As noted previously in applications involving the protection of multiphase networks, each phase could be monitored by a separate sensor module and the trip signals of all modules combine so that an overcurrent condition on any one phase will result in the interruption of the currents in all phases.

In the illustrated embodiment the inverse-time trip function or the instantaneous trip function may be individually inhibited by control signals $V_G$ and $v_J$ applied to the units 68 and 74, respectively.

The level indicator 50 provides a visual indication of the present occurrence of a fault, and the delay indicator 76 and the instantaneous indicator 78 provide provide visual indications of inverse-time or instantaneous trips which have occurred since these last two mentioned units were reset. Switch 82 is provided to simultaneously reset both indicator units. It will be readily apparent that in installations involving a plurality of sensor units a second switch may be coupled in series with the supply voltage 80 prior to the indicator reset switches (such as switch 82) associated with each individual sensing module. By means of this second switch all modules may be simultaneously reset.

Thus there has been described a static, solid-state, time-overcurrent sensor that possesses the characteristics of versatility, economy, accuracy, operational reliability, and speed required by the industry. The sensor incorporates the circuitry for inverse-time-overcurrent monitoring, instantaneous overcurrent monitoring and selective inhibit, as well as indication devices, into a single compact module causing small power loading of the instrumentation circuit.

The particular embodiment described herein, by way of illustration, is intended primarily for use in power transmission and distribution systems. However, it will be apparent that the device may be readily adapted to other applications which require a reliable overcurrent protective device. This adaptability results from the extended control range provided in the device of the subject invention.

It should be noted that while the invention has herein been shown and described in what is conceived to be the most practical and preferred embodiment, it is realized that departures may be made therefrom within the scope of the invention which is not limited to the details disclosed herein, but is to be afforded the full scope of the claims so as to embrace any and all equivalent devices.

Having described the invention, what is claimed as new in support of the Letters Patent is:

1. In a system for monitoring the time-current relationship in a conductor:
   first means for generating a first voltage signal representative of the current in said conductor;
   second means including selectively adjustable means coupled to said first means for generating a first current signal as a desired nonlinear function of said first voltage signal, said second means including a solid-state device having a nonlinear input voltage-output current transfer characteristic and operable on a different portion of its transfer characteristic, dependent upon the adjustment of said selectively adjustable means, to generate said first current signal as said desired nonlinear function of said first voltage signal; and
   third means coupled to said second means for generating a second voltage signal as a function of the time integral of the first current signal.

2. In a system for monitoring the time-current relationship in a conductor:
   first means for generating a first voltage signal representative of the current in said conductor;
   second means coupled to said first means for generating a first current signal as a nonlinear function of said first voltage signal, said second means including a solid-state device having a nonlinear input voltage-output current transfer characteristic; and third means coupled to said second means for generating a second voltage signal as a function of the time integral of the first current signal;

wherein said solid-state device is a transistor having collector, base and emitter terminals with the base and emitter terminals coupled across said first means, and said emitter terminal further coupled to said third means.

3. The device of claim 2 further comprising resistive means for coupling the emitter terminal to said first and third means.

4. In a system for monitoring the time-current relationship in a conductor:

first means for generating a first voltage signal representative of the current in said conductor;

second means coupled to said first means for generating a first current signal as a nonlinear function of said first voltage signal, said second means including a solid-state device having a nonlinear input voltage-output current transfer characteristic;

third means coupled to said second means for generating a second voltage signal as a function of the time integral of the first current signal;

wherein said solid-state device is a transistor having collector, base and emitter terminals with the base and emitter terminals coupled across said first means, said emitter terminal further coupled to said third means, and further comprising resistive means for coupling the emitter terminal to said first and third means; and wherein said resistive means includes a nonlinear voltage dependent resistor.

5. In a system for monitoring the time-current relationship in a conductor:

first means for generating a first voltage signal representative of the current in said conductor;

second means coupled to said first means for generating a first current signal as a nonlinear function of said first voltage signal, said second means including a solid-state device having a nonlinear input voltage-output current transfer characteristic;

third means coupled to said second means for generating a second voltage signal as a function of the time integral of the first current signal;

wherein said solid-state device is a transistor having collector, base and emitter terminals with the base and emitter terminals coupled across said first means, said emitter terminal further coupled to said third means, and further comprising resistive means for coupling the emitter terminal to said first and third means; and wherein said second means includes a potential source having a first terminal coupled to said collector and having a second terminal; said third means includes a first resistive device coupled in series with an energy storage element; said third means being coupled between said resistive means and said second terminal, with said first resistive device connected to said resistive means, and said energy storage element connected to said second terminal.

6. The device of claim 3 wherein said first means includes adjustment means for varying the coupling between said first and second means; whereby the nonlinear response of said second means varies with the setting of said adjustment means.

7. The device of claim 5 wherein said storage element comprises a capacitor.

8. The device of claim 5 further including a second resistive device coupled between the junction of the first resistive device and the resistive means, and the second terminal.

9. The device of claim 5 wherein said first means comprises current transformer means inductively coupled to said circuit; a rectifier coupled across the output of the current transformer means; and a potentiometer connected across said rectifier output terminals with the wiper output terminal of said potentiometer coupled to said base terminal; whereby the nonlinear response of said second means varies with the position of the wiper.

10. The device of claim 5 wherein said first resistive device is a variable resistor.

11. In a system for monitoring the time-current relationship in a conductor:

first means for generating a first voltage signal representative of the current in said conductor;

second means coupled to said first means for generating a first current signal as a nonlinear function of said first voltage signal, said second means including a solid-state device having a nonlinear input voltage-output current transfer characteristic;

third means coupled to said second means for generating a second voltage signal as a function of the time integral of the first current signal;

fourth means, coupled to said conductor, for generating a first control signal when the current in said conductor exceeds a first predetermined level; and fifth means coupled to said fourth means and responsive to said first control signal for clamping said second voltage signal to a second predetermined reference level when the current in said conductor is below the first predetermined predetermined level.

12. The device of claim 11 wherein said third means includes a bank of selectable energy storage elements for storing said first current signal; said fourth means includes a comparator and a voltage reference circuit; and said fifth means includes a transistor switching circuit coupled across said bank of selectable storage elements and controlled by the output signal of said comparator circuit.

13. The device of claim 12 wherein said voltage reference circuit comprises adjustment means for varying the reference level of said fourth means.

14. The device of claim 12 further comprising first actuation means coupled to said third means for developing a first actuation signal when said second voltage signal exceeds a third predetermined voltage level.

15. The device of claim 14 wherein said first actuation means includes a unijunction device having first and second base terminals coupled across a potential source, having an emitter terminal; and further includes means for applying said second voltage signal to the emitter terminal of said unijunction device.

16. The device of claim 11 further comprising second actuation means, coupled to said first means, for developing a second actuation signal when said first voltage signal exceeds a third predetermined voltage level.

17. The device of claim 14 further comprising tripping means for interrupting the current in said conductor upon the generation of said first actuation signal.

18. The device of claim 14 further comprising second actuation means for generating a second actuation signal when the current in said conductor exceeds a selected current value; and tripping means for interrupting the current in said conductor in response to either one of the first and second actuation signals.

19. The device of claim 18 further comprising first indicator means for indicating the occurrence of the first actuation signal.

20. The device of claim 19 further comprising second indicator means for indicating the occurrence of the second actuation signal.

21. The device of claim 20 further comprising level indicator means for indicating the occurrence of said first actuation signal.